United States Patent [19]

Terada et al.

[11] 3,902,135

[45] Aug. 26, 1975

[54] LASER OSCILLATOR WITH A WAVELENGTH STABILIZING DEVICE

[75] Inventors: Toru Terada; Isao Yamaguchi, both of Tokyo, Japan

[73] Assignee: Canon Kabushiki Kaisha, Japan

[22] Filed: Feb. 25, 1974

[21] Appl. No.: 445,437

Related U.S. Application Data

[63] Continuation of Ser. No. 291,773, Sept. 25, 1972, abandoned.

[52] U.S. Cl. .................................. 331/94.5 S
[51] Int. Cl.² .................................. H01S 3/08
[58] Field of Search .............. 331/94.5; 356/106; 350/269, 285

[56] References Cited
UNITED STATES PATENTS

| | | | |
|---|---|---|---|
| 3,488,123 | 1/1970 | Nichols | 356/106 |
| 3,568,088 | 3/1971 | Dessus | 331/94.5 |
| 3,609,587 | 9/1971 | Kolb et al. | 331/94.5 |

Primary Examiner—William L. Sikes
Attorney, Agent, or Firm—McGlew and Tuttle

[57] ABSTRACT

The laser tube constantly maintains a desired uniform wavelength of the laser beam. At least one of the two mirror members of the laser tube is movable, and is coupled magnetically with an electromagnetic stabilizing mechanism. The magnetic power of the electromagnetic mechanism is adjustable so that the distance between the two mirror members can be maintained constant irrespective of temperature changes and the like. As a result, a laser beam having a constant desired uniform wavelength is obtained.

7 Claims, 8 Drawing Figures

LASER OSCILLATOR WITH A WAVELENGTH STABILIZING DEVICE

This is a streamline continuation of application Ser. No. 291,773 filed Sept. 25, 1972 now abandoned.

FIELD AND BACKGROUND OF THE INVENTION

The present invention relates to a laser tube, particularly to a laser tube by means of which a laser beam having a constant desired uniform wavelength can be obtained.

The wavelength of a laser beam is determined by the distance between two mirrors in a laser tube. However, the distance between the two mirrors is apt to vary, depending on the temperature during operation of the laser tubes. Consequently, the wavelength of the laser beam is apt to vary while the laser tube is in operation. A laser beam with a constantly uniform wavelength can be obtained by maintaining the distance between the two mirrors constant irrespective of changes in temperature. To this end, there has been proposed a laser tube in which a piezo-electric element is attached to one of the two mirrors and has a voltage applied thereto when the wavelength of the laser beam varies, thus compensating the distance between the two mirrors and maintaining the distance uniform.

However, because of the nature of the piezo-electric element used in the laser tube, compensation cannot be effected over a wide range. Consequently, the laser tube is placed in a constant temperature state, for example, dipped in a constant temperature tank, to maintain the distance between the two mirrors substantially uniform. Then the piezo-electric element is used for a fine adjustment.

However, in order to vary the distance between the mirrors through about 0.3 um using a piezo-electric element, it has been necessary to apply a voltage of about 1000V to the element.

SUMMARY OF THE INVENTION

In accordance with the invention, the distance between the two mirrors of a laser tube is controlled by an electromagnetic mechanism which effects relative axial displacement of one mirror with respect to the other mirror to maintain the distance between the two mirrors constant.

As a further feature of the invention, a Brewster window plate is interposed between at least one mirror and the adjacent end of a capillary tube, and such a Brewster window plate may be interposed between each of the two mirrors and the respective adjacent end of the capillary tube.

As a further feature of the invention, the space between either one or both of the mirrors and the adjacent Brewster window plate may be evacuated.

An object of the invention is to provide a laser tube with which a laser beam having a constant desired uniform wavelength can be obtained.

Another object of the invention is to provide such a laser tube in which the distance between the two mirrors of the laser tube can be maintained uniform over a wide range of mirror-to-mirror distances.

A further object of the invention is to provide such a laser tube in which at least one of the two mirrors is made movable and is coupled magnetically to an electromagnetic mechanism the strength of whose field may be adjusted to maintain a constant desired distance between the two mirrors.

For an understanding of the principles of the invention, reference is made to the following description of typical embodiments thereof as illustrated in the accompanying drawings.

DESCRIPTION OF THE PREFERRED EMBODIMENTS

Figure 1:
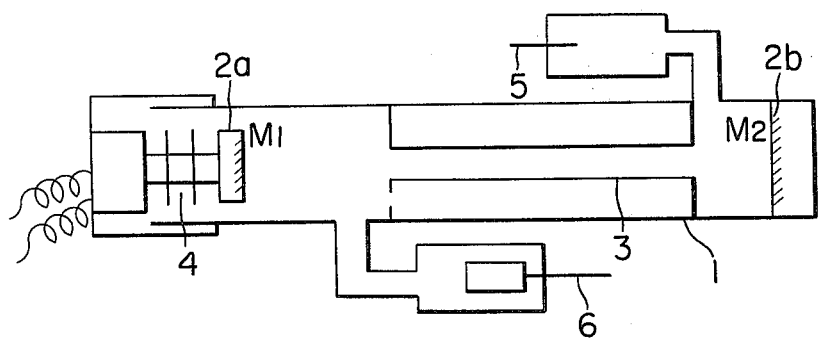
FIG. 1 is a sectional view of one form of conventional laser tube modified in accordance with the invention.

Referring first to FIG. 1, a cylindrical laser tube 1 has a movable mirror member 2a(M1) positioned near its left end and a preferably fixed second mirror member 2b(M2), positioned adjacent its right end, the two mirrors being coaxial with each other. A capillary tube 3 is positioned between and coaxial with the mirrors 2a and 2b. An electromagnetic means 4 is provided at the end of laser tube 1 nearer mirror 2a, and is coupled magnetically with mirror 2a so as to adjust the position of movable mirror 2a in accordance with the strength of the magnetic field produced by electromagnetic means 4. Thus, when the spacing between the two mirrors is changed, as due to changes in temperature, it is possible to restore the distance to the original value or to maintain the distance constant by varying the energization of the electromagnetic means 4. Additionally, laser tube 1 is provided with an anode 5 and a cathode 6.

Figure 2:
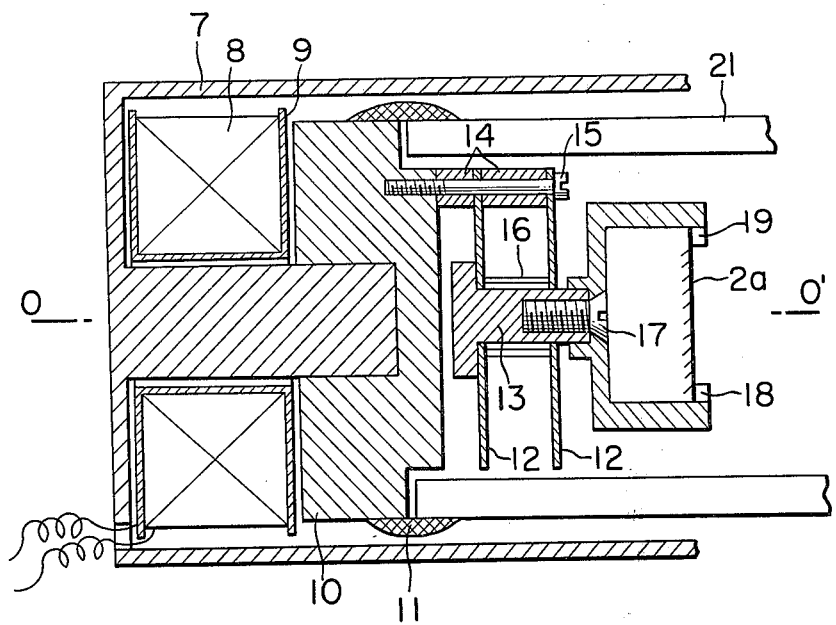
FIG. 2 is an enlarged sectional view of the left end of the laser tube shown in FIG. 1.

FIG. 2 shows details of an electro-magnetic oscillation mechanism 4 embodying the invention for moving the mirror 2a, this mechanism differing from that shown in FIG. 1 in certain respects which will now be described.

The open left end of a laser tube 21 is closed by a member 10 of non-magnetic material which is sealed to tube 21 by a suitable adhesive 11. Mirror 2a is fixed in place, within a mirror case 18, by a mirror holder or retainer 19, and case 18 is secured by a screw 17 to a magnetic material armature 13. Leaf springs 12 are fixed to armature 13, at their inner peripheries, and have their outer peripheries secured to non-magnetic element 10 through the medium of screws 15 with the interposition of spacers 14, spacers 16 being interposed between the inner peripheries of the leaf springs 12.

With the described arrangement, mirror 2a is supported on non-magnetic element 10 in a manner so that it is movable to the left and to the right along the axis O — O'. An iron core 7 has one end fixed to the non-magnetic element 10 so that this end faces armature 13 but is spaced therefrom by a portion of non-magnetic element 10. A coil 8, wound on a spool 9, embraces the iron core 7, and it will be noted that core 7 has a cylindrical skirt extending therefrom to a point at least beyond the mirror 2a.

When current is supplied to coil 8 to energize the same, iron core 7 is magnetized and causes the magnetic armature 13, facing one end core 7, to be shifted to the left parallel to the axis O — O' against the bias of leaf springs 12. This also shifts mirror 2a to the left parallel to the axis O — O'. The magnitude of such parallel shifting of mirror 2a is dependent upon the energization of coil or winding 7. Thus, as the distance between mirrors 2a and 2b increases, the energization of winding or coil 7 can be decreased so that mirror 2a will be moved to the right under the bias of leaf springs 12 so that the distance between the two mirrors can be maintained constant.

When winding 8 is deenergized completely, armature 13 and, with armature 13, mirror 2a, return to their original positions. If winding 8 is energized with alternating current, mirror 2a will be oscillated or reciprocated parallel to the axis O — O'.

In the above mentioned laser tube, as the distance between the mirrors 2a and 2b can be varied by the intensity of energization of the exciting coil, the coil can be used for stabilizing the wavelength and further for the purpose of generally controlling the wavelength. The laser resonator will not be out of alignment during use, while the distance between mirrors can be varied with a small input voltage into the electromagnetic oscillating mechanism. Furthermore, since there is no hysteresis between the input voltage into the mechanism and the amount of displacement, there are advantages in that not only wavelength stabilization can be easily done with automatic control (in the case of piezo-electric control there is hysteresis), but also the frequency characteristics of the oscillating mechanism can be suitably varied by changing the elasticity characteristics of the leaf springs used and, at the same time, the inclination of the mirror during operation can be reduced to a very small degree.

The present invention also improves the structure of a laser tube and by providing Brewster window plates between the mirrors and the adjacent ends of the plasma generating capillary tube 3. In this manner, oscillating plane of the laser beam can be fixed at incident planes of the Brewster windows, and contamination of the mirrors with dust can be prevented by evacuating air from the space between the Brewster window plates and the mirrors and at the same time effects due to the disturbance caused by air can be eliminated.

Figure 3:
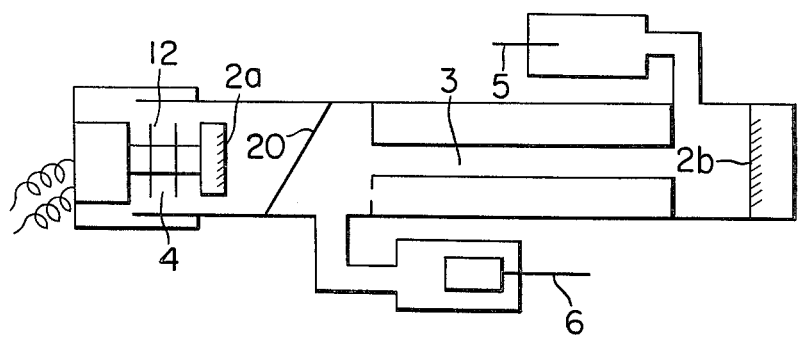
FIG. 3 is a view, similar to FIG. 1, illustrating a Brewster window interposed between one mirror and the adjacent end of a capillary tube.

In the second example of the present invention shown in FIG. 3, the difference is that a Brewster window 20 is positioned between mirror 2a and capillary tube 3. This Brewster window 20 contributes to making the laser beam completely linearly polarized and preventing mirror 2a from being damaged by electrons and ions. The window plate 20 is so inclined that its incident angle against optical axis will be $\theta = \tan^{-1} n$ (wherein $n$ is a refractive index of the window plate material).

Since the present invention has the above mentioned composition, the oscillating plane (plane of the polarization) of laser beam can be fixed at the incident plane of the Brewster window plate 20. Therefore, there will be little of such troubles as caused by rotation, etc. of the plane of polarization generated when there is no Brewster window, so that there is the advantage that stable operation can be expected.

Figure 4:
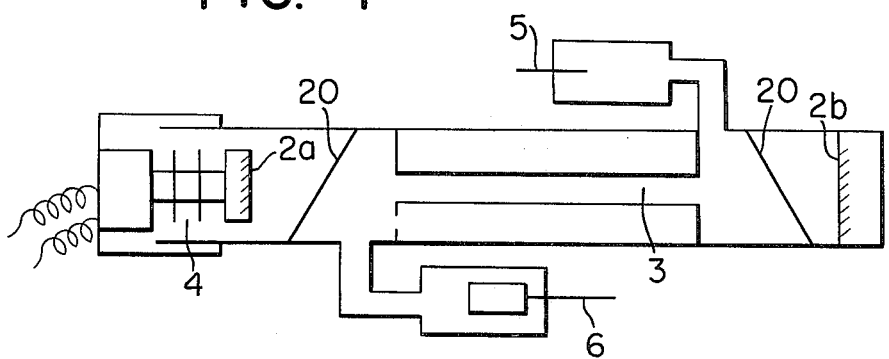
FIG. 4 is a view similar to FIG. 3 illustrating Brewster windows between each of the mirrors and the adjacent ends of the capillary tube.

FIG. 4 illustrates a modification of the arrangement shown in FIG. 3, in which a second Brewster window 20 is provided, in the same manner, between mirror 2b and the adjacent end of capillary tube 3.

Figure 5:
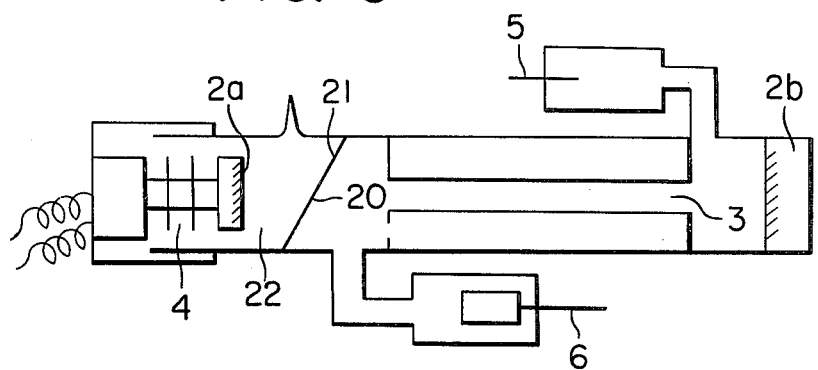
FIG. 5 is a view similar to FIG. 3 but illustrating the space between the mirror and the adjacent Brewster window as being evacuated.

In the arrangement illustrated in FIG. 5, which is a modification of that shown in FIG. 3, the space 22 between Brewster window 20 and mirror 2a is evacuated by evacuating air through an exhaust part 21, which is then sealed. By maintaining the space 22 under a vacuum, the disturbance of the laser output by turbulence of the gaseous material is prevented.

Figure 6:
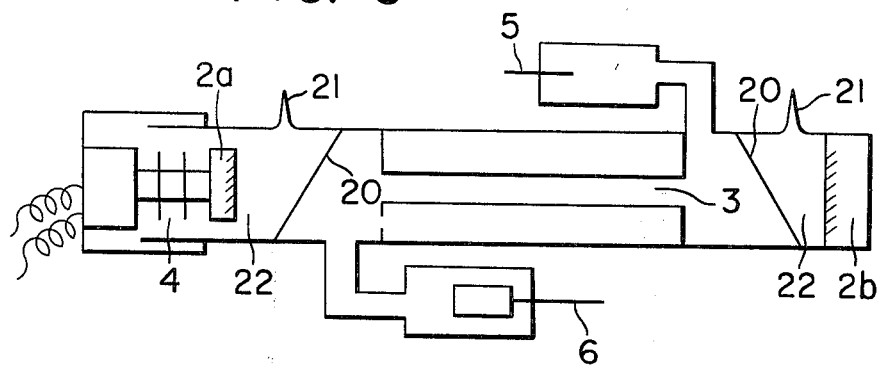
FIG. 6 is a view similar to FIG. 4 but illustrating the spaces between each mirror and the adjacent Brewster window as evacuated.

FIG. 6 illustrates a modification of the arrangement shown in FIG. in which the space 22 between the mirror 2b and the Brewster window 20 is also evacuated through an exhaust part 21 which is then sealed.

Figure 7:
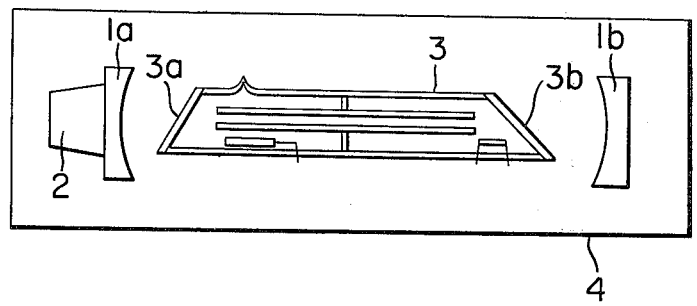
FIG. 7 is a schematic sectional view of another form of conventional laser tube.

FIG. 7 shows an outline of a conventional wave stabilization laser, wherein 1a, 1b are mirrors positioned facing each other, 2 is a mirror driving part, 3 is a tube having Brewster windows 3a, 3b at its opposite ends, and 4 is a thermostatic chamber. In this construction, laser oscillation is interrupted by erroneous adjustment of mirrors 1a and 1b and, in such case, readjustment is necessary. However, since many of the lasers generally used with wavelength stabilization are short and have a small gain, adjustment is quite difficult unless an operator is skilled in making such adjustment. Furthermore, a very precise mechanism is necessary for properly adjusting the mirrors and for maintaining the mirrors in proper adjustment. In addition, dust and the like adhere to the mirrors 1a and 1b and to the Brewster windows 3a and 3b, and will interrupt laser oscillation. The circulation of air between mirrors 1a and 1b and Brewster windows 3a and 3b causes undesirable effects. The distance between mirrors 1a and 1b must be kept constant for stabilizing the wavelength, and to that end usually the temperature must be kept uniform with very high accuracy (with an accuracy of 0.1° to 0.01°C).

The present invention provides a wavelength stabilizing laser in which the above mentioned shortcomings are eliminated, and is characterized by incorporating the mirrors constituting a laser oscillating part and the Brewster windows in an integral structure by a connecting member in a portion of which a piezo electric crystal is inserted, and evacuating air from the space therebetween so that the distance between the mirrors is constant irrespective of temperature variation.

Figure 8:
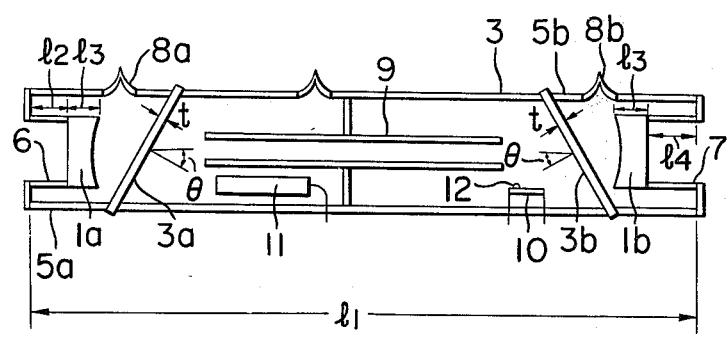
FIG. 8 is a view similar to FIG. 7 but illustrating the laser tube as modified in (M1) with the present invention.

Referring to FIG. 8, the inner plane surfaces of Brewster windows 3a and 3b are bonded to the respective adjacent ends of a tube 3 made of Pyrex glass, the ends of tube 3 being cut at the Brewster angle. The correspondingly bevelled ends of connecting tubes 5a and 5b, also formed of Pyrex glass, for example, are bonded to the outer plane surfaces of Brewster windows 3a and 3b, respectively. An aluminum cylinder 6 has its inner end bonded to mirror 1a and its outer end bonded to the outer end of connecting tube 5a. Similarly, an oscillating cylinder 7, made from a piezo-electric crystal, has its inner end bonded to mirror 1b and its outer end bonded to connecting tube 5b. The cylinders 6 and 7 are coaxial with each other and with the axis of a capillary tube 9. The bonding may be effected by the use of respective annular bonding disks as illustrated. The respective spaces between mirrors 1a and 1b and the adjacent Brewster windows 3a and 3b are evacuated through respective exhaust openings 8a and 8b, which are then sealed. The tube is further provided with an anode 10, a cathode 11 and a getter 12.

On the other hand, the parts shown in the drawing as $l$, $t$, $\theta$ are so designed that their dimensions will satisfy the following condition equation, wherein $\alpha$ is a coefficient of linear expansion.

As an example, when $$l_1 = 200 \text{ mm}, \quad \alpha_1 = 3 \times 10^{-6}$$
$$l_3 = 7 \text{ mm}, \quad \alpha_3 = 9 \times 10^{-6}$$
$$l_4 = 13 \text{ mm}, \quad \alpha_4 = 2 \times 10^{-6}$$
$$t = 3 \text{ mm},$$
$$\theta = 56.5°,$$

wherein $\alpha_2 = 23 \times 10^{-6}$, $l_2$ will satisfy the following equation:

$$l_2 = \frac{1}{\alpha_2} [l_1\alpha_1 + 2t(\alpha_3 - \alpha_1)\sec\theta - \alpha_4 l_4 - 2\alpha_3 L_3]$$
$$= 22.3 \text{ mm}.$$

As raw materials, those described in the Examples will be used.

AC and DC exciting potentials are impressed on the above mentioned oscillating cylinder 7.

As explained above the laser with a wavelength stabilizing device of the present invention is so made that the mirror and the Brewster window which constitute the oscillating part, are made integral through a connecting part, and the dimension of each part is designed so that expansion in different directions with a change in temperature will be the same so that they will offset each other. Therefore the distance between the mirrors, after assembly, will always be constant, so that constantly stable wavelength can be obtained, yet the structure is simple and strong. Also the space between the mirrors and the Brewster window is tightly sealed and is evacuated. Thereby no dust, etc. will adhere on the opposing surfaces, and since there is almost no air among the parts, the undesirable effects due to air convection, as in a conventional device, are absent so that satisfactory laser oscillation can be expected. Furthermore there are such advantages that high degree of wavelength stabilization can be expected by properly controlling the direct current impressed on the exciting member made of piezo electric crystal inserted in a part of the connection between the Brewster window and the mirrors.

What is claimed is:

1. In a laser tube, providing a laser beam with a constantly uniform wavelength, of the type having a capillary tube therein, an anode and cathode operable to impress an operating voltage on the capillary tube, a pair of mirror members each positioned in the laser tube adjacent a respective end of the capillary tube in alignment with the axis thereof, and means mounting at least one of the mirror members for movement parallel to the axis relative to the other mirror: the improvement comprising, in combination, an armature of magnetic material secured to said one mirror member for movement therewith; said mounting means including a non-magnetic member closing the adjacent end of said laser tube and elastic means supporting said armature from said non-magnetic member within said laser tube, for movement parallel to said axis in opposite axial directions and normally biasing said armature to a preset intermediate position; an electromagnetic means, external to said laser tube, axially aligned with and facing said armature but separated from said armature by said non-magnetic member, and including an energizing winding; and means operable to supply current to said winding to adjust and control the axial distance between said mirror members by adjusting the magnitude and direction of the current supplied to said winding.

2. A laser tube, according to claim 1, in which said elastic means comprises biasing means opposing movement of said one mirror member by said electromagnetic means.

3. A laser tube, according to claim 1, including a Brewster window positioned between at least one of said mirror members and the adjacent end of said capillary tube.

4. A laser tube, according to claim 3, in which the space between said Brewster window and said one mirror member is evacuated.

5. A laser tube, according to claim 3, including two Brewster windows each positioned between one of said mirror members and the adjacent end of said capillary tube.

6. A laser tube, according to claim 5, in which the space between each Brewster window and the associated mirror member is evacuated.

7. A laser tube, as claimed in claim 1, in which said elastic means, responsive to deenergization of said winding, restore said one mirror member to its initial intermediate position.

* * * * *

UNITED STATES PATENT OFFICE
CERTIFICATE OF CORRECTION

Patent No. 3,902,135                Dated August 26, 1975

Inventor(s) Toru Terada et al.

It is certified that error appears in the above-identified patent and that said Letters Patent are hereby corrected as shown below:

On the cover sheet insert:

(30) Foreign Application Priority Data

-- September 29, 1971     Japan     46-76069

December 11, 1971     Japan 46-100345 --.

Signed and Sealed this

Thirtieth Day of November 1976

[SEAL]

Attest:

RUTH C. MASON
*Attesting Officer*

C. MARSHALL DANN
*Commissioner of Patents and Trademarks*